March 17, 1964 Q. W. HALL ETAL 3,124,918
INDUSTRIAL APPARATUS
Filed Dec. 8, 1961 13 Sheets-Sheet 1

INVENTORS
QUENTIN W. HALL
ANTHONY T. SOLOMON
BY Hyden Ballard

March 17, 1964 Q. W. HALL ETAL 3,124,918

INDUSTRIAL APPARATUS

Filed Dec. 8, 1961 13 Sheets-Sheet 2

INVENTORS
QUENTIN W. HALL
ANTHONY T. SOLOMON

BY Hydle W. Ballard

INVENTORS
QUENTIN W. HALL
ANTHONY T. SOLOMON

BY Adw. Ballard

March 17, 1964 Q. W. HALL ETAL 3,124,918

INDUSTRIAL APPARATUS

Filed Dec. 8, 1961 13 Sheets-Sheet 4

INVENTORS
QUENTIN W. HALL
ANTHONY T. SOLOMON

BY Hedd. Ballard

INDUSTRIAL APPARATUS

Filed Dec. 8, 1961 13 Sheets-Sheet 5

INVENTORS
QUENTIN W. HALL
ANTHONY T. SOLOMON

BY

March 17, 1964 Q. W. HALL ETAL 3,124,918

INDUSTRIAL APPARATUS

Filed Dec. 8, 1961 13 Sheets-Sheet 6

INVENTORS
QUENTIN W. HALL
ANTHONY T. SOLOMON

BY Hyde W. Ballard

INVENTORS
QUENTIN W. HALL
ANTHONY T. SOLOMON

BY H. dale. Ballard

March 17, 1964 Q. W. HALL ETAL 3,124,918

INDUSTRIAL APPARATUS

Filed Dec. 8, 1961 13 Sheets-Sheet 8

INVENTORS
QUENTIN W. HALL
ANTHONY T. SOLOMON

BY Hyde W. Ballard

INVENTORS
QUENTIN W. HALL
ANTHONY T. SOLOMON
BY Hyde W. Ballard

March 17, 1964 Q. W. HALL ETAL 3,124,918

INDUSTRIAL APPARATUS

Filed Dec. 8, 1961 13 Sheets-Sheet 10

INVENTORS
QUENTIN W. HALL
ANTHONY T. SOLOMON
BY
Hyde W. Ballard

*INVENTORS*
QUENTIN W. HALL
ANTHONY T. SOLOMON
*BY*
Hydew. Ballard

March 17, 1964 Q. W. HALL ETAL 3,124,918

INDUSTRIAL APPARATUS

Filed Dec. 8, 1961 13 Sheets-Sheet 12

INVENTORS
QUENTIN W. HALL
ANTHONY T. SOLOMON
BY
Hyde W. Ballard

INVENTORS
QUENTIN W. HALL
ANTHONY T. SOLOMON
BY
Hyde W. Ballard

United States Patent Office 3,124,918
Patented Mar. 17, 1964

3,124,918
INDUSTRIAL APPARATUS
Quentin W. Hall and Anthony T. Solomon, Burlington, N.C., assignors to Burlington Industries, Inc., Greensboro, N.C., a corporation of Delaware
Filed Dec. 8, 1961, Ser. No. 158,090
15 Claims. (Cl. 53—125)

This invention relates to apparatus for semi-automatically stuffing the preformed pleats or pockets of a two-ply fabric, particularly one intended for use as vehicle upholstery. In addition to the apparatus itself, the invention is also directed to the provision of a flat-back stuffed upholstery fabric.

Present-day styling for upholstery fabrics in vehicles, particularly automobiles, requires what is known in the trade as a "puffed" fabric. Such fabrics customarily use a stuffing element which may be a weft yarn to achieve a raised or three-dimensional effect on the face of the fabric. A particular class of puffed fabric is the one in which relatively long, straight pockets in the fabric are filled with a stuffing material which conveniently takes the form of compressed felt of miscellaneous fibers. This stuffing material is supplied in a bat or belt form from rolls and heretofore no satisfactory apparatus has been devised for economically and quickly inserting this relatively limp stuffing into the longitudinal pockets or pleats preformed in the fabric. Furthermore, it is considered highly desirable to form the stuffed, pleated fabric in such a way that the back of the fabric is substantially flat and the valleys between the raised pleats are substantially exposed.

The primary object of the invention, therefore, is to provide semi-automatic or fully automatic apparatus for inserting the felted stuffing into transverse pockets in a fabric as it traverses a filling station in the device.

A further object of the invention is to provide in apparatus for stuffing the pockets of a two-ply fabric, means for clamping the leading edge of the fabric and automatic means for applying clamps to the fabric on either side of the stuffing needle and to means for clamping the stuffing in the fabric to permit the needle to continue to pass through the fabric and be withdrawn.

A further object of the invention is to provide in apparatus for stuffing the pockets of a two-ply fabric, nose means for insuring the proper and correct insertion of the stuffing needle into the pocket.

A still further object of the invention is to provide in apparatus for stuffing the pockets of a two-ply fabric, suitable control means for guiding the advance of the fabric in step-by-step sequence and also in controlling and locating the forward edge of the fabric as it passes over the table.

A still further object of the invention is to provide a plurality of automatically actuated clamps for holding adjacent pockets in the two-ply fabric described in connection with the present invention.

A further object of the invention is to provide suitable electrical connections and circuits for the various sequentially controlled operations in the automatic stuffing machine of the class described.

Figure 1:
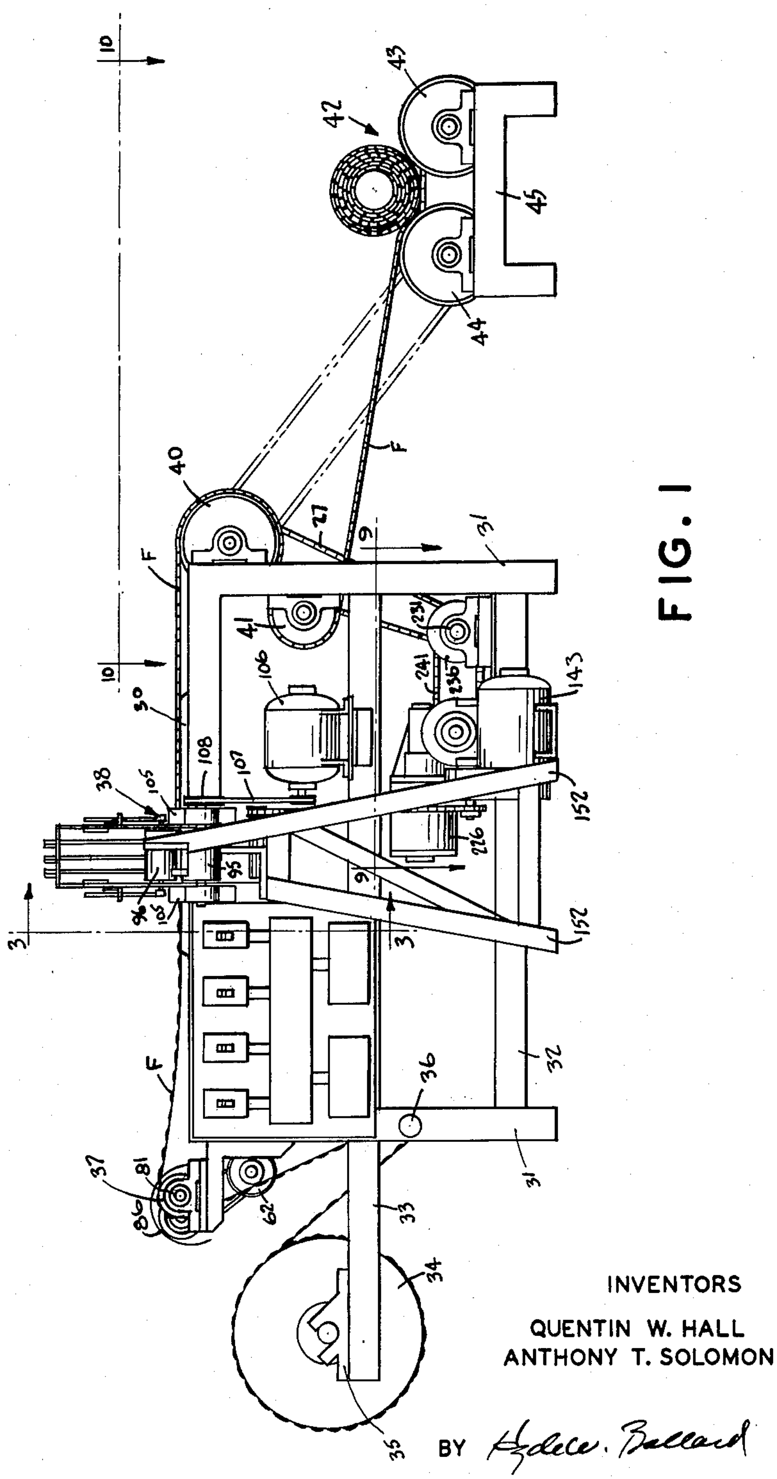
Figure 2:
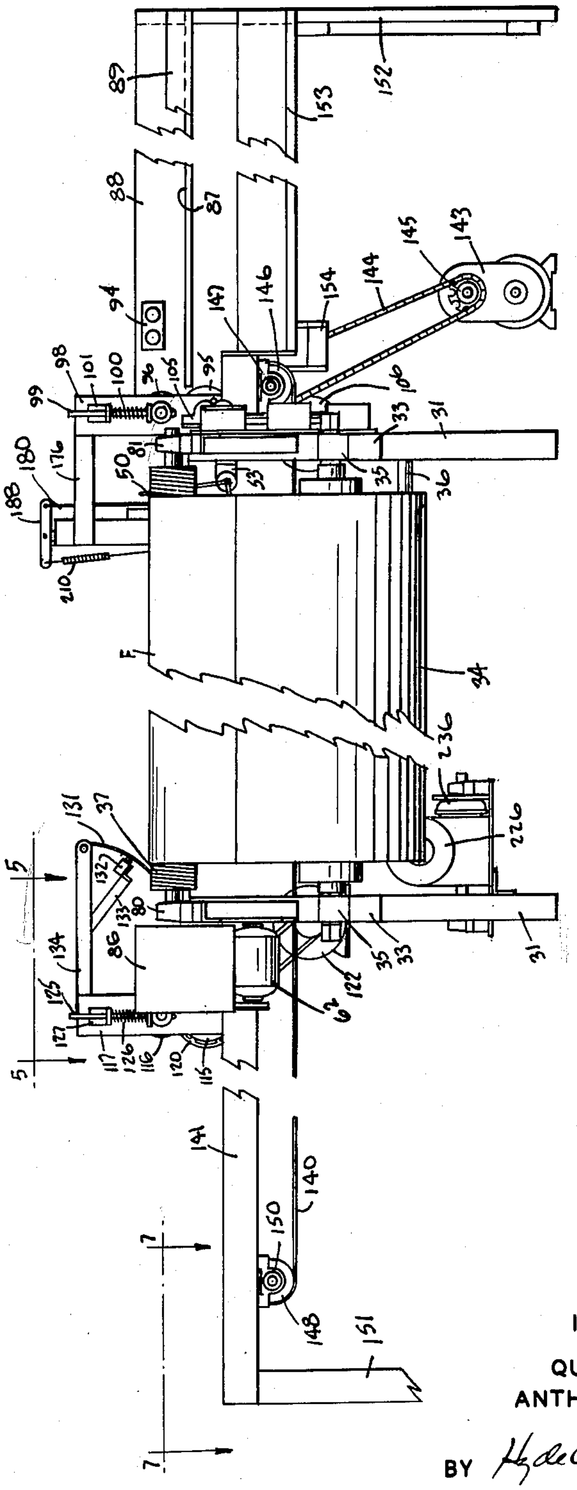
Figure 3:
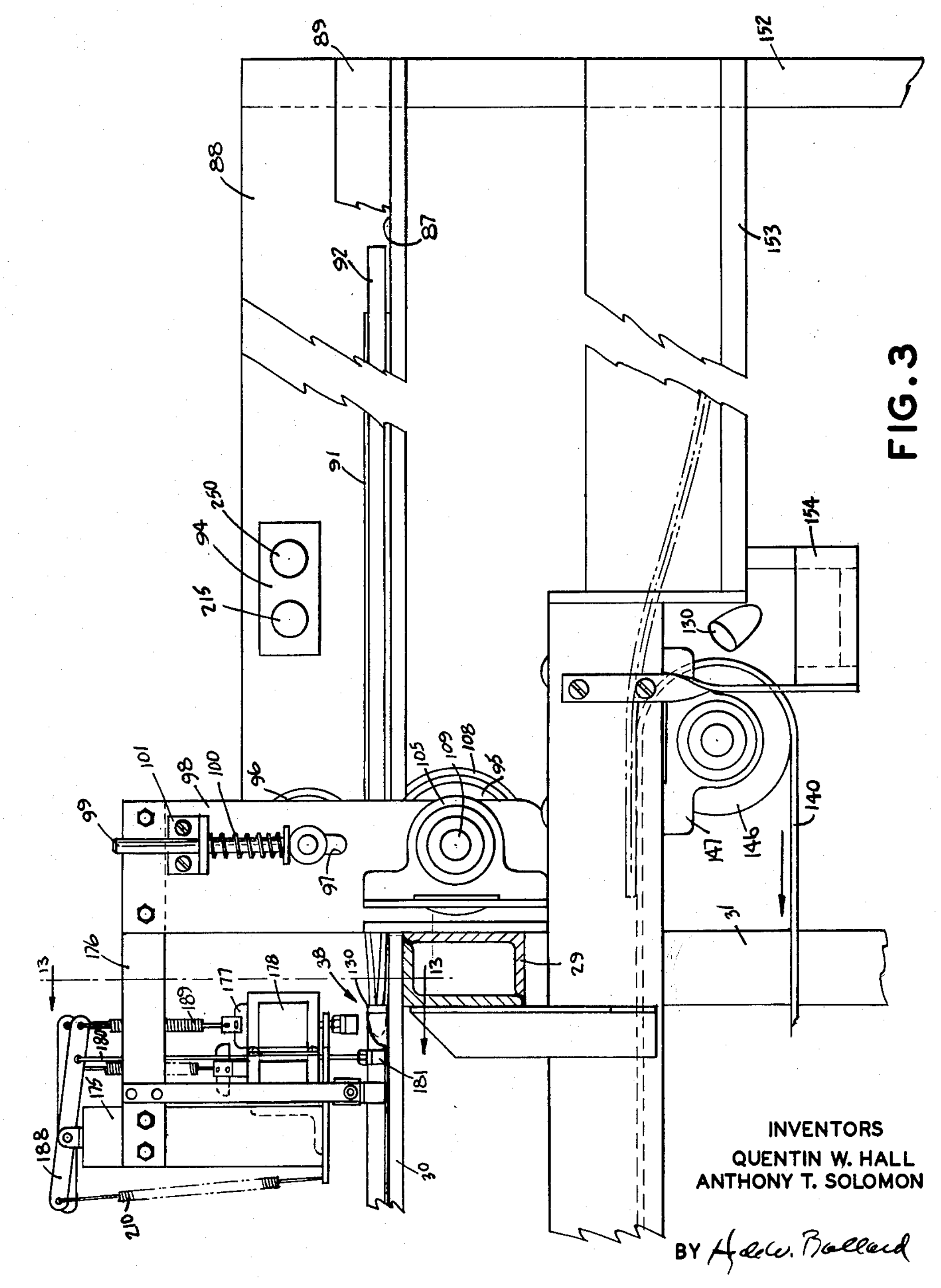
Figure 4:
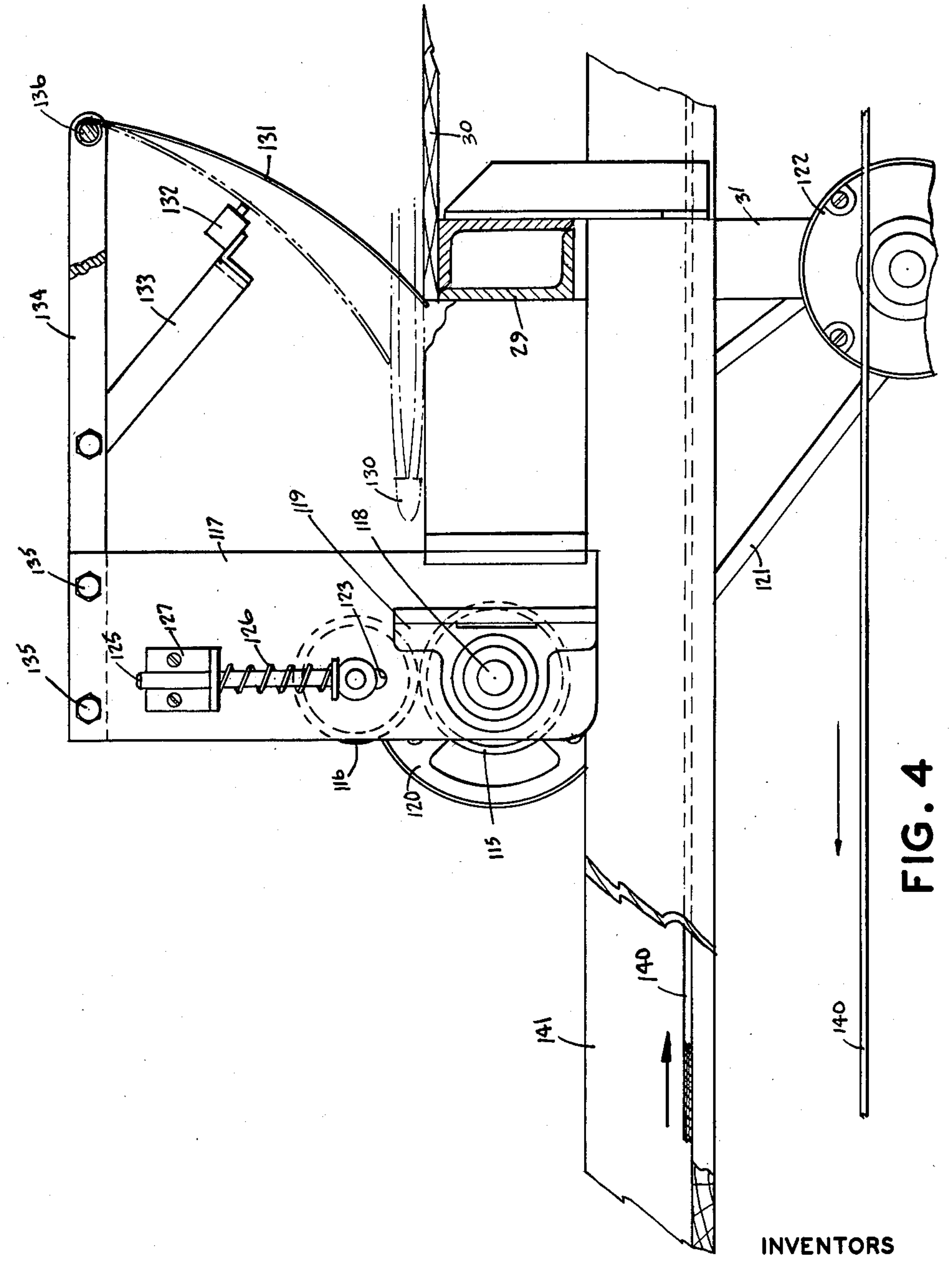
Figure 5:
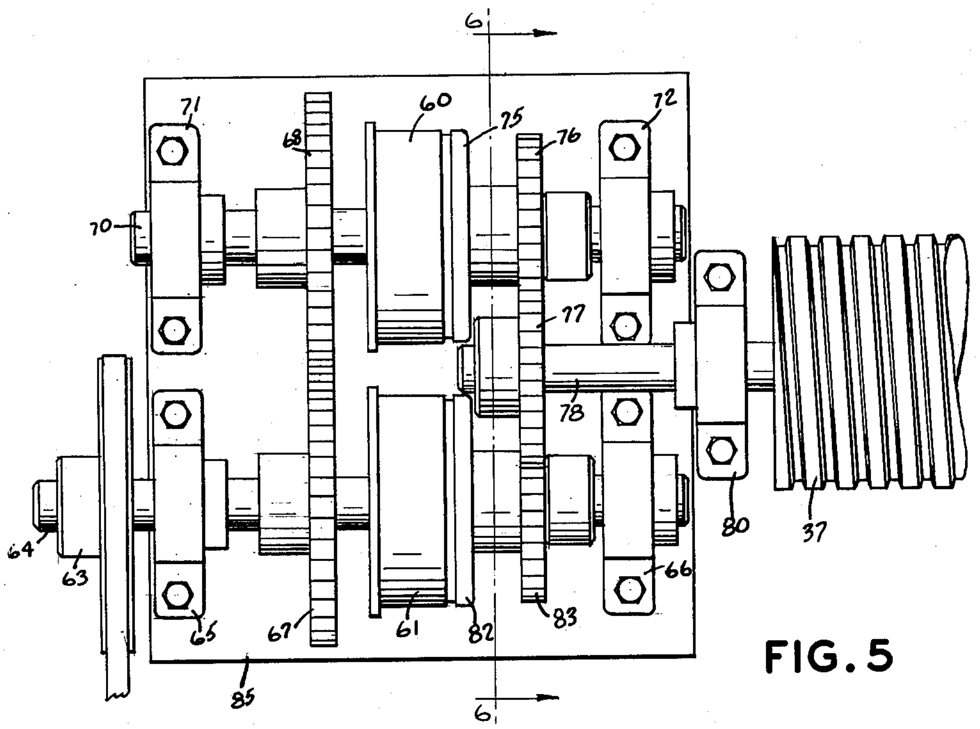
Figure 6:
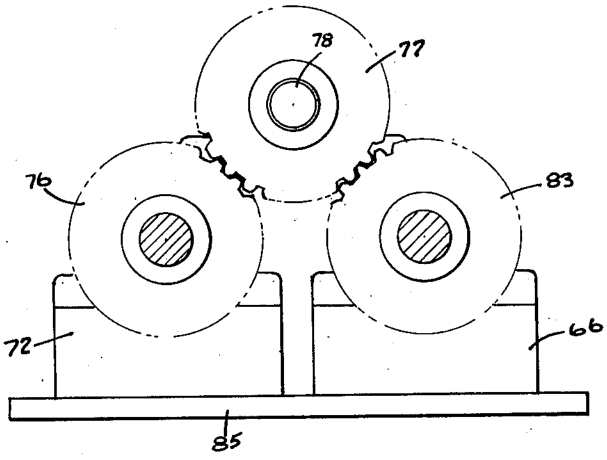
Figure 7:
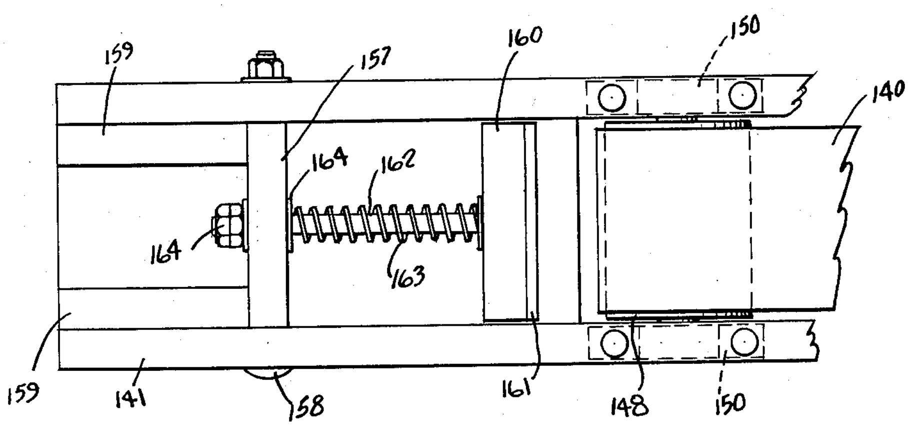
Figure 8:
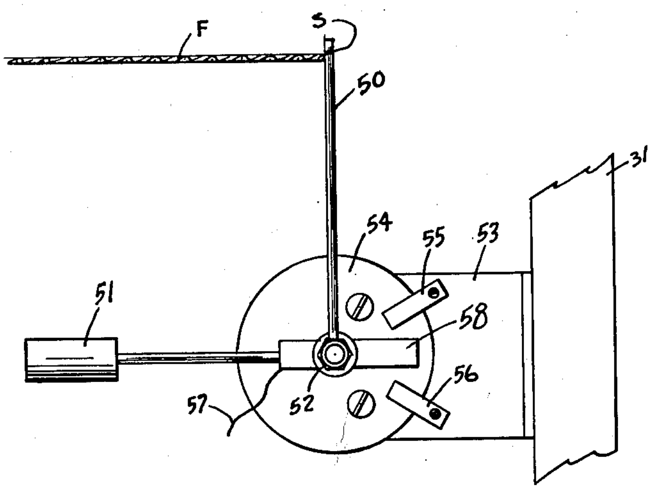
Figure 9:
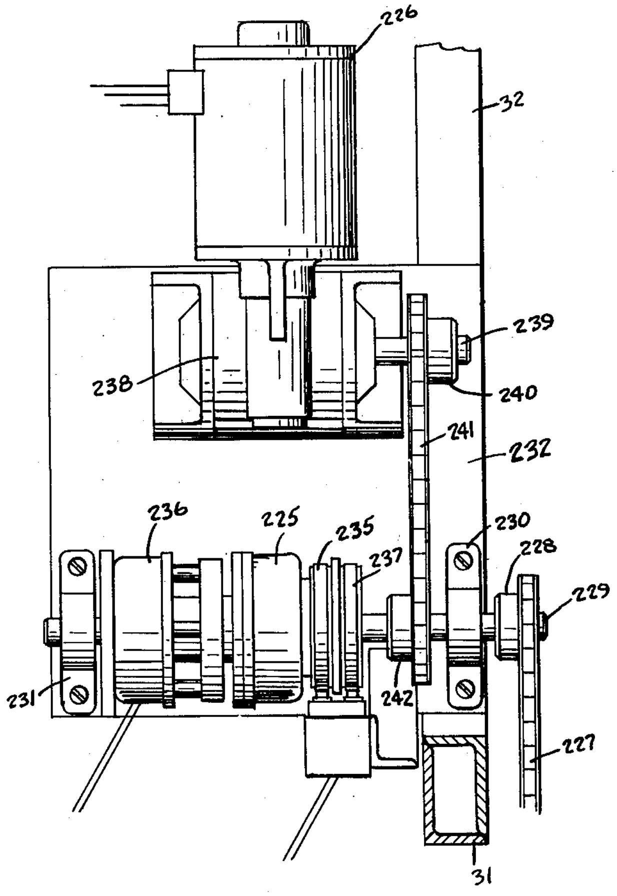
Figure 10:
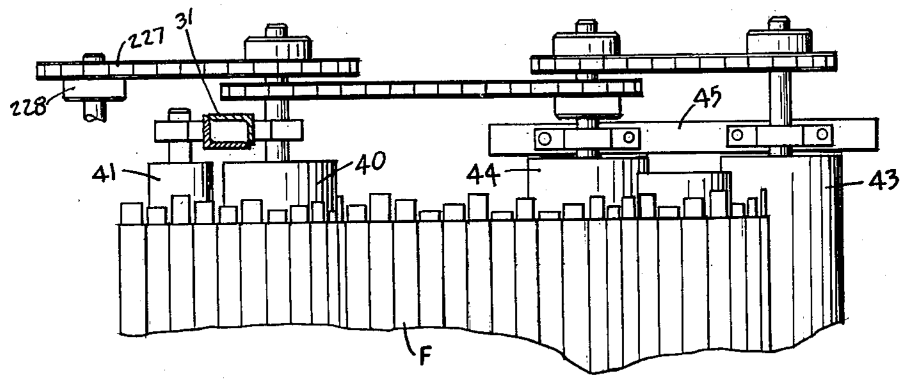
Figure 11:
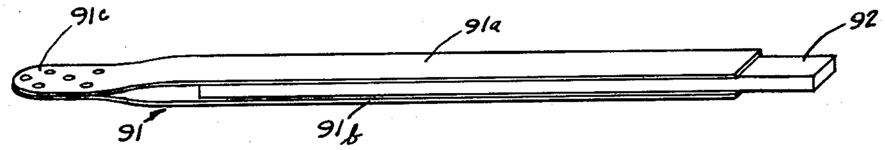
Figure 12:
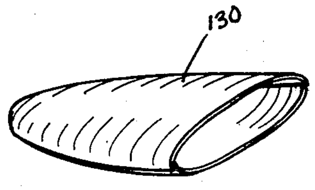
Figure 13:
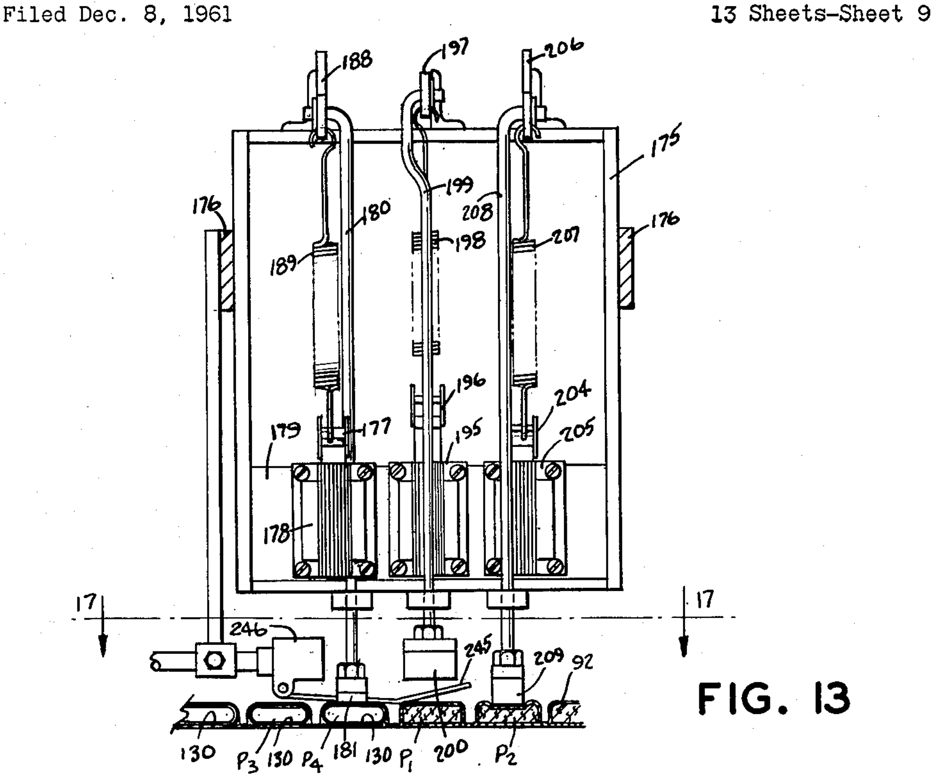
Figure 24:
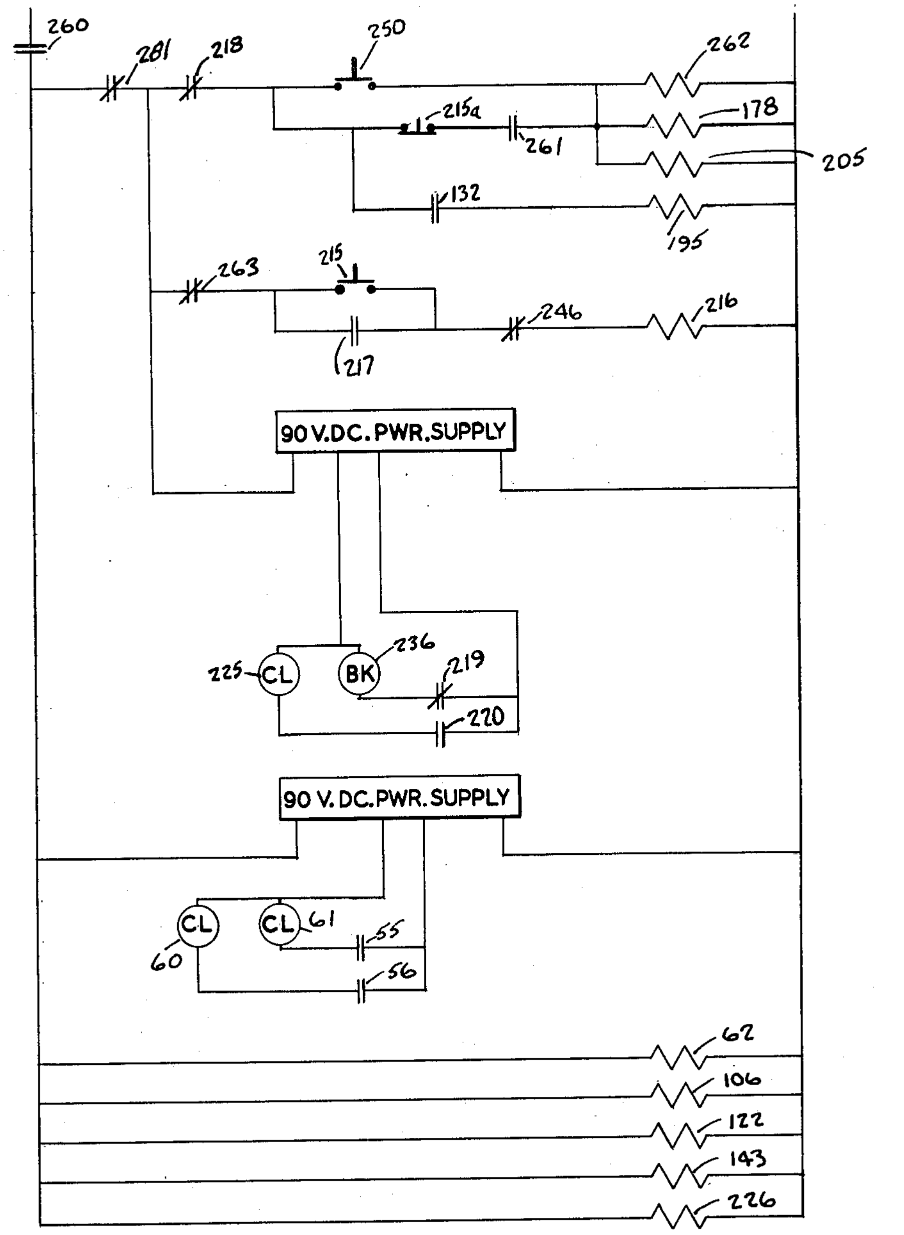
Figure 25:
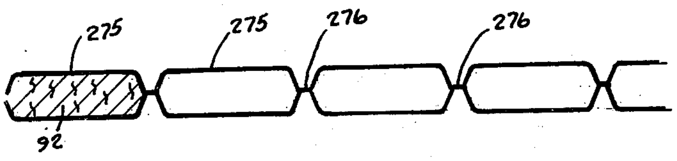
Figure 26:
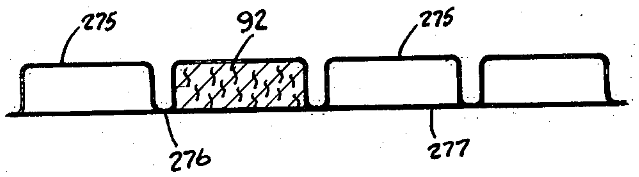
Figure 27:
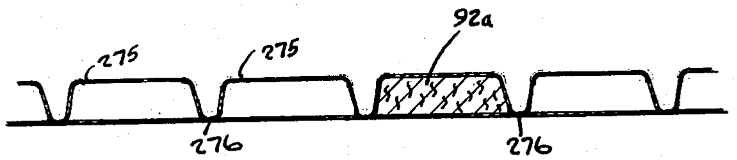
Figure 28:
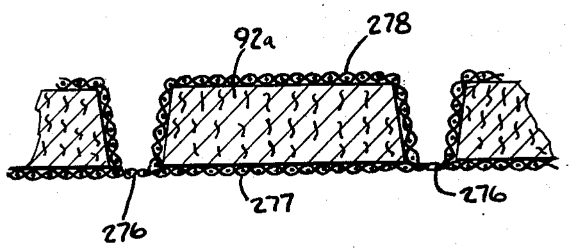

Further objects will be apparent from the specification and drawings in which:

FIG. 1 is a side view of the stuffing apparatus constructed in accordance with the present invention, FIG. 2 is an end view of the apparatus of FIG. 1, FIG. 3 is an enlarged detail of the needle feeding and clamping structure of the righthand portion of the machine as seen generally at 3—3 of FIG. 1, FIG. 4 is an enlarged sectional detail of the opposite side of the apparatus showing particularly the withdrawing roll stand and the stuffing needle as it actuates one of the clamping switches, FIG. 5 is an enlarged top view showing the driving clutches and mechanism for the spiral fabric feeding roll seen generally at 5—5 of FIG. 2, FIG. 6 is a section as seen at 6—6 of FIG. 5, FIG. 7 is an enlarged fragmentary detail showing the top of the needle delivery chute and as seen generally at 7—7 of FIG. 2, FIG. 8 is a schematic showing of the edge sensing finger which actuates the clutches of FIG. 5, FIG. 9 is an enlarged detail as seen at 9—9 of FIG. 1, FIG. 10 is an enlarged fragmentary detail showing the driving end of the take-up and pin rollers seen generally at 10—10 of FIG. 1, FIG. 11 is a perspective of one of the threading needles, FIG. 12 is a perspective showing the nose for the threading needles, FIG. 13 is an enlarged sectional detail of the clamping mechanism as seen at 13—13 of FIG. 3, FIGS. 14–16 are progressive views showing the relative position of the clamps of FIG. 13 during the stuffing cycle, FIGS. 17–23 are schematic views showing the progressive sequential steps in the stuffing cycle and the relative position of the needles, clamps, and sensing switches, FIG. 24 is a circuit diagram for the various electrically controlled elements of the apparatus, FIG. 25 shows a stuffed fabric constructed in accordance with the present invention before final treatment, FIG. 26 shows the fabric of FIG. 25 after flattening the back thereof, FIG. 27 shows a modified form of the pleated upholstery fabric in which the valleys between the pleats are sloped, and FIG. 28 is an enlarged sectional detail of one of the pleats of the fabric of FIG. 27.

Referring now more particularly to FIGS. 1 and 2, the present apparatus comprises a horizontal platform 30 supported on a plurality of legs 31, 31 provided with suitable horizontal braces or stretchers 32 and 33. The two-ply fabric with preformed pockets is supplied from a beam or roll 34 journaled in blocks 35, 35 mounted on an extension of the braces 33. The fabric fed from roll 34 passes under a guide 36 thence over a spiral aligning roll 37 which is automatically controlled, and thence to the stuffing station indicated generally at 38. A rubber-covered driving or pulling roll 40 is journaled at the opposite end of platform 30 and after passing around substantially half of the periphery of this roll, the stuffed fabric travels over a roller 41 and thence to a builder or take-up device 42 which comprises a pair of driven friction surface rollers 43 and 44 mounted in a stand 45.

The spiral edge control roller 37 is intermittently turned in either direction through the medium of a sensing finger 50 which is urged against the edge of fabric F by means of a weight 51 (FIG. 8). Finger 50 is pivoted at 52 on a bracket 53 mounted on one of the vertical frame members or legs 31. An insulating disc 54 of dielectric material is bolted to bracket 53 and is provided with electrical contact elements 55 and 56. Contacts 55 and 56 are mounted in stationary disc 54 and an electrical circuit to one or the other of the contacts is completed through a lead 57 when the finger 50 pivots either to the right or to the left depending on the position of the fabric selvedge S which contacts the finger. A circuit is completed through lead 57 and arm 58 when the arm touches one or the other of the contacts 55 or 56. This causes spiral roll 37 to be turned clockwise or counterclockwise by means of a pair of magnetic clutches 60 and 61 (FIG. 5). These clutches are driven by means of a motor 62

(FIG. 2) through suitable pulleys and belt, the driven pulley being designated 63 in FIG. 5. Pulley 63 is keyed to shaft 64 which is journaled in pillow blocks 65 and 66 and is also provided with a spur gear 67 which meshes with a spur gear 68 keyed to counter-shaft 70. Gears 67 and 68 have a ratio of 1:1 so that shafts 64 and 70 turn at the same speed. Shaft 70 is journaled in pillow blocks 71 and 72 and drives an electrical clutch 60 whereas clutch 61 is driven by shaft 64. The disengageable element 75 of clutch 60 is integrally connected to a spur gear 76 which meshes with spur gear 77 on shaft 78 of spiral roller 37. Shaft 78 is journaled in bearings 80 and 81, the former being shown in FIG. 5. Similarly the disengageable driven element 82 of clutch 61 is formed integrally with a spur gear 83 which also meshes with spur gear 77. It will be understood that clutches 60 and 61 are selectively engaged and disengaged or both are disengaged. It is impossible, of course, for both to be simultaneously engaged. Due to the fact that shafts 64 and 70 turn in opposite directions, the direction of rotation of spiral roll 37 depends upon which of the clutches 60 or 61 is engaged. In this way, the rotation of the spiral roll controls the lateral position of the fabric F so that the transverse position of one selvedge of the fabric is accurately controlled as it passes through the stuffing station 38.

The driving mechanism just described for spiral roll 37 is mounted on a plate 85 which serves as an extension of the platform 30. Also, a suitable guard or cover 86 (FIG. 2) is provided for the roll driving mechanism. As noted above, the primary function of the edge aligning mechanism described above is to maintain the selvedge S of fabric F in a substantially uniform position as the selvedge passes through the stuffing station 38. This is an important feature of the present device since the location of the selvedge to the clamping mechanism determines the ability of the needle to insert the stuffing material through the pockets without buckling or interference therefrom.

Referring now to FIGS. 3 and 4, the feeding side of the apparatus is provided with an upper feeding platform or trough 87 leaving a back needle guiding wall 88 and a front wall 89 for the stuffing needle 91. Pre-cut lengths of stuffing material 92 are enclosed in and carried by the needle as will be described hereinafter. A two button control switch 94 is conveniently mounted on wall 88. At the inner end of the feed platform 87, we mount a pair of driven rolls 95 and 96, the upper one of which is journaled in slots 97 in the vertical frame members 98, 98. The proper nip pressure between rolls 95 and 96 is provided by means of spring-loaded plungers 99, 99 under pressure of compression springs 100, 100. The springs 100 are adjustably compressed by means of angle brackets 101, 101, bolted to each of the frame members 98, 98. The lower roller 95 is journaled in pillow blocks 105, 105 and is driven by means of a motor 106 (FIG. 1) through a belt 107 and suitable pulleys, the upper one of which 108 is keyed to shaft 109 of roller 95. Rollers 95 and 96 may be termed the delivery or insertion rollers whereas a pair of driven extracting rollers 115 and 116 serves to complete the travel of the needle 91 through each pocket of the fabric. Rollers 115 and 116 are mounted in vertical frame members 117, 117 and the shaft 118 of roller 115 is journaled in pillow blocks 119, 119, and provided with a pulley 120 which is in turn driven through a belt 121 from a motor 122 (FIG. 4). As previously described in connection with roller 96, the upper roller 116 is adjustable in slots 123, 123 in frame members 117, and suitable nip pressure is provided for roller 116 by means of plungers 125, 125 and compression springs 126, 126 which abut adjusting angle brackets 127, 127. It will be noted that the nip of rollers 95, 96, and 115 and 116 is in line with the top of platform 30 so that as the needle 91 passes between the nip of the rollers, it is at the proper elevation to become inserted in each of the fabric pockets. The sequence and operation of the inserting steps will be described more fully hereinafter in conjunction with FIGS. 17–24.

The needle having deposited its strip of felt in the individual pockets is then returned to the loading side of the machine as will now be described. As seen in FIGS. 4 and 12, the needle is provided with a cone-shaped nose 130 before it is inserted into each fabric pocket. There are several important reasons for using the nose on the needle rather than projecting the needle into the pocket directly. In the first place, the noses are previously inserted in each pocket before the fabric arrives at the filling station 38. This prevents any of the pockets from sticking shut which is sometimes caused by the finish applied to the fabric. Furthermore, it insures that the needle nose does not catch on the fabric due to slight misalignment. The shape of the nose also prevents accidental rupture of the pocket by the needle should the fabric become puckered in any way. As shown in FIG. 1, several of the noses 130 may be pre-inserted in the leading edge of each pocket before the fabric advances to the loading station 38.

As the needle 91 progresses through the pleat of the fabric under the control of rollers 95 and 96, it emerges from the opposite selvedge of the fabric and strikes a swinging plate 131 which, in a pivoted position shown in broken lines in FIG. 4, actuates a switch 132 mounted on an arm 133 suspended from a horizontal bracket 134. The bracket 134 is supported on frame member 117 by bolt 135, 135 and the switch plate 131 is pivoted at the outer end of bracket 134 on pin 136. The actuation of switch 132 closes a circuit which maintains the stuffing 92 in the pleat while permitting the needle 91 to continue its travel until the nose 130 engages the nip of rollers 115 and 116. At this point the nose is detached from the tip of the needle and falls onto an endless conveyor belt 140. This is accomplished by a higher peripheral speed of rollers 115, 116 compared to the peripheral speed of rollers 95, 96. Further movement of the needle 91 under control of rollers 95 and 96 securely pushes the needle into the nip of rollers 115 and 116 whereupon these extracting rollers take over the control of the needle and complete the pulling of the needle from the pleat. When the trailing end of the needle passes between the nip of rollers 115 and 116 it likewise is deposited on the conveyer 140 and returned to the loading trough 187 as is shown in FIG. 3.

The upper pass of conveyer belt 140 travels in a trough 141 and is driven by a combined motor and gear reduction unit 143 (FIG. 2), a chain 144, sprocket 145, and roller 146 journaled in pillow blocks 147, 147. At the opposite end of trough 141 the belt 140 passes over an idler roller 148 journaled in pillow blocks 150, 150. The trough 141 is supported at one end on upright post 151 and at the other end on standards 152, 152. As the needle leaves the belt 140 at roller 146, it is deposited into a storage bin or receiving trough 153 directly under the feeding trough 87. Prior to the dropping of the needle into trough 153, the nose 130 which has preceded the needle on conveyer 140 drops into the nose receptacle 154 as shown in FIG. 3.

A suitable shock absorbing mechanism is provided at the opposite end of trough 141 since the needle is projected into the trough with considerable force when it leaves the nip of rollers 115 and 116. Referring to FIG. 7, a cross member 157 is secured to the sides of trough 141 by means of a through bolt 158. Cross member 157 is additionally braced by means of blocks 159, 159 at the extreme terminus of the trough. A spring loaded bumper 160 having a leather face 161 is mounted on a plunger 162 and is slidable in member 157. The bumper 160 is resiliently held in position by means of a compression spring 163 positioned on plunger 162 between the bumper and the member 157. Suitable washers 164 and lock nuts 165 control the limit of extension of the bumper with respect to the cross member.

As each nose 130 drops into the nose receptacle 154, the operator has ample time to insert one or more of the noses 130 into each succeeding pleat as the fabric advances over the platform 30. When ready for the next stuffing operation, the operator transfers the needle from the receiving trough 153 to the loading trough 87 having inserted a new length of the stuffing material 92 into the needle. The insertion of the individual lengths of stuffing material will be described more fully in connection with FIG. 11 which shows the detailed construction of the needle 91. A pair of flat resilient strips of material such as steel *91a* and *91b* are curved adjacent each end thereof and secured to each other at *91c* by welding, riveting, or other suitable means. The flare or bend in each strip *91a* and *91b* is sufficient to provide a space between the strips substantially equal to the thickness of each length of stuffing material 92. The operator is able to spread the strips *91a* and *91b* apart to permit ready insertion of the stuffing material and in such a way that the trailing edge of the material extends somewhat beyond the termini of the strips as shown in FIG. 11. With the needle so filled, the operator then places the needle against the back wall 88 of the loading trough 87 in readiness for the next indexing and stuffing cycle.

The operation of the clamping mechanism at loading station 38 will now be described in detail in connection with FIGS. 3 and 13–24. Three fabric-holding clamps are mounted in a housing 175 supported from frame member 98 by means of a pair of horizontal arms 176, 176 (FIGS. 3 and 13). The first clamp assembly comprises an armature 177 actuated by a solenoid 178 secured to bracket 179 which controls a plunger 180 having a resilient foot or pad 181 of an elastomeric material such as foam rubber. The armature 177 is connected to a lever 188 by means of an extension spring 189 and the lever 188 is pivoted on the top of housing 175 as shown in FIG. 3. The plunger 180 is connected to lever 188 and guided in the bottom of bracket 175.

The second clamp assembly which serves as the stuffing extractor is the middle one of the three clamps shown in FIG. 13. It comprises a solenoid 195 mounted on bracket 179 having an armature 196 which pivots a lever 197 through the agency of an extension spring 198. Lever 197 is likewise fulcrumed on the top of housing 175 and actuates a plunger 199 which is pivoted to the opposite end of the lever. The plunger 199 at its lower end is slidably mounted on the bottom of the bracket 175 and carries a larger resilient facing or shoe 200 which can be pressed against the fabric F for the purpose of permitting withdrawal of the needle and leaving a length of stuffing 92 in each pocket.

The third clamp is actuated by the armature 204 of solenoid 205 also mounted on bracket 179 and moving a lever 206 through an extension spring 207. Lever 206 is pivoted on the top of housing 175 and is connected to a plunger 208 also slidably retained in the bottom of the housing and provided with a resilient shoe or facing 209. In order to insure proper return of the armatures 177, 196, and 204, we provide a series of return springs 210, 210 (FIG. 3) for each of the levers on the opposite side of their respective fulcrums.

*Operation*

With the needle 91 loaded with an appropriate length of stuffing 92 as shown in FIG. 3, the operator presses the start button 215 which completes a circuit to relay 216 (FIG. 24), thus closing the relay holding contact 217, opening normally closed relay contacts 218, 219, and closing normally open contacts 220. The closing of contact 220 engages the clutch 225 which advances the fabric F by engaging the motor 226 with the main drive chain 227 as shown in FIG. 9. Drive chain 227 is trained over a sprocket 228, keyed to shaft 229, journaled in pillow blocks 230 and 231 all mounted on plate 232 secured to frame stretcher 32. The driven clutch element 235 is keyed to shaft 229 which in turn is provided with an electric brake 236 controlled by contacts 219 (FIG. 24). Motor 226 drives the clutch element 237 through the speed-reducing unit 238, shaft 239, sprocket 240, and chain 241. Clutch element 237 is formed integrally with a sprocket 242. This completes the driving mechanism from motor 226 to the rubber-covered fabric roll 40 which may be seen in FIG. 1.

Figure 14:
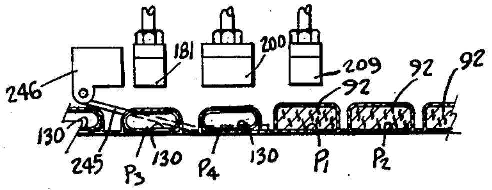
Figure 15:
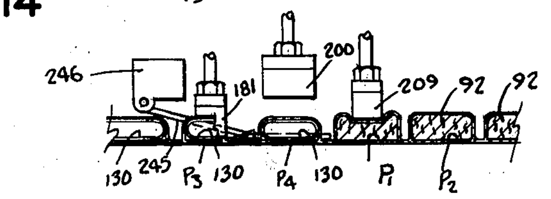
Figure 16:
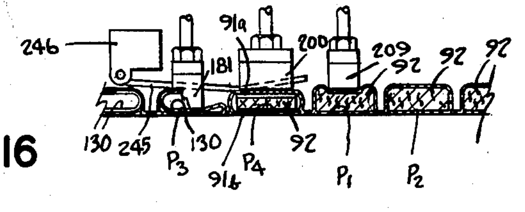

With the brake disengaged when relay contacts 219 are opened, the motor 26 through clutch 225 turns roll 40 thus advancing the fabric F along the top of platform 30. The fabric continues to advance until the sensing finger 245 (FIG. 13) drops from the previously inserted and filled pocket P1 as shown in FIG. 14. When this occurs, the travel of fabric F is stopped due to the opening of switch 246 controlled by finger 245. This in turn results in the de-energization of relay 216 and the consequent opening of contacts 220 for clutch 225 and the closing of contacts 219 to apply the brake 236. The operator then closes the "hold" switch 250 which energizes solenoids 178 and 205 thus operating clamps 181 and 209. This condition is shown in FIG. 15, in which the pocket P1 previously filled with stuffing is clamped as is likewise pocket P3 in back of the nose 130 that has been inserted in the front of this pocket. The next succeeding empty pocket P4 has been lined up with trough 87 in which the needle 91 is resting. In this condition, the operator starts the needle 91 through the nip of rolls 95 and 96 from whence it is automatically fed into the aligned nose piece 130 in pocket P4 and inserted into and through the pocket together with a stuffing element 92. When the nose 130 on the needle strikes the switchplate 131 to close switch 132, clamp 200 is urged against the top of pocket P4 through energization of solenoid 195. Nevertheless, the needle 91 continues to be fed through the pocket and the needle slides readily in the pocket under the pressure of clamp face 200 until the tail of the needle has passed from underneath the clamp. At this point, the clamp exerts its full pressure on the end of the pocket and the tail of the stuffing 92 to lock the stuffing in place in the pocket while permitting the needle to be withdrawn from the pocket due to the combined action of the rollers as described above. The clamping position of the shoe 200 is shown in FIG. 16. In this view all three of the clamps are pressed against the fabric so that there is no danger of puckering on either side of the pocket P4, the one currently being filled.

Figure 17:
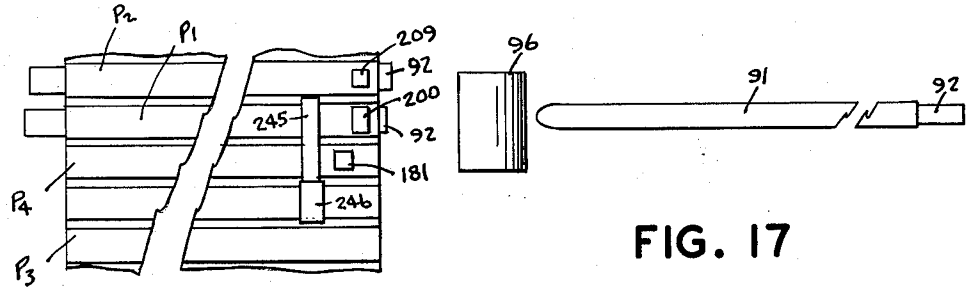
Figure 18:
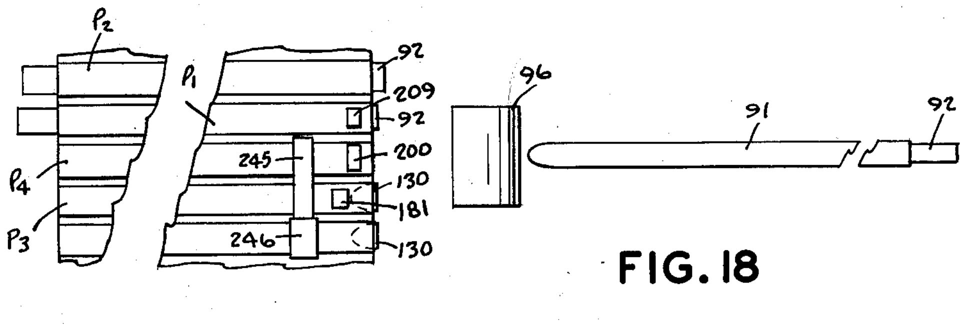
Figure 19:
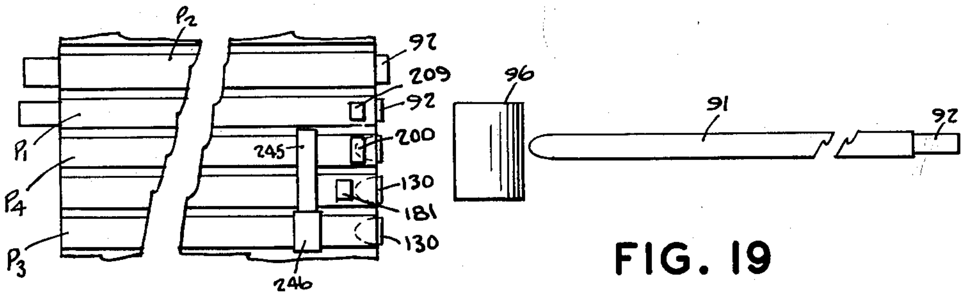

FIG. 17 shows the relative position of the clamps and the fabric after a pocket, for example, P1, has just been filled. In this position all three of the clamps 181, 200, and 209 are raised and only the main motor 226 is running. The raising of the three clamps occurs when contacts 218 are opened due to the de-energization of relay 216 which in turn takes place upon the opening of the index switch 246 when finger 245 is raised by the insertion of nose 130 and needle 91 into the pocket P4. When the operator then pushes the index switch 215, the fabric is advanced from bottom to top in FIG. 17 until the finger 245 drops from the filled pleat or pocket P1 as shown in FIG. 18. This in turn applies the brake 236 and opens contacts 220 in the clutch circuit to stop further fabric advance as described above. At this point, the operator then closes the hold switch 250 which drops clamps 209 and 181, the latter of which is offset substantially from the selvedge edge of the fabric to permit insertion of a nose 130 in each empty pocket waiting to be registered with the needle 91. The clamping of pockets adjacent to pocket P2 as shown in FIG. 19 prevents any chance of the fabric puckering at the selvedge when the needle is inserted. This clamped position is shown in FIGS. 19 and 15 just prior to the insertion of the needle. As the needle is directed between rollers 95 and 96 it picks up the nose 130 in pocket P4 and carries it under the aligned tip of the finger 245. This raises the finger and opens the switch 246 to de-energize relay 216 which in turn closes contacts 218, 219, and opens contacts 220 and 217.

*Electrical Circuits*

To follow in specific detail the cycle of operation with respect to the various electrical circuits, reference is made to FIGS. 17–23, 13–16, and the circuit diagram, FIG. 24.

Figure 20:
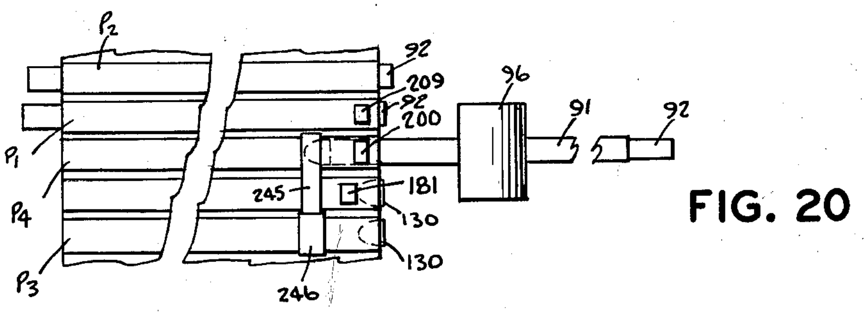
Figure 21:
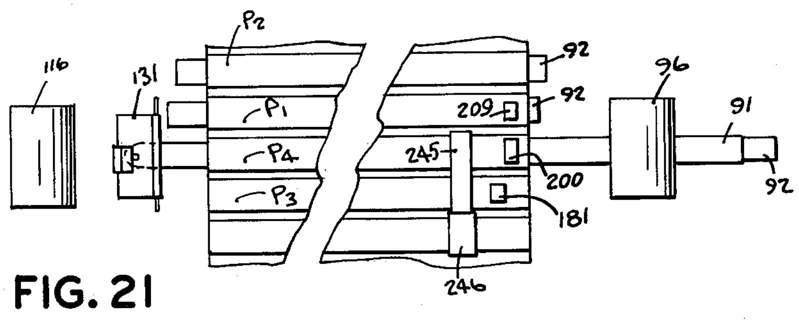
Figure 22:
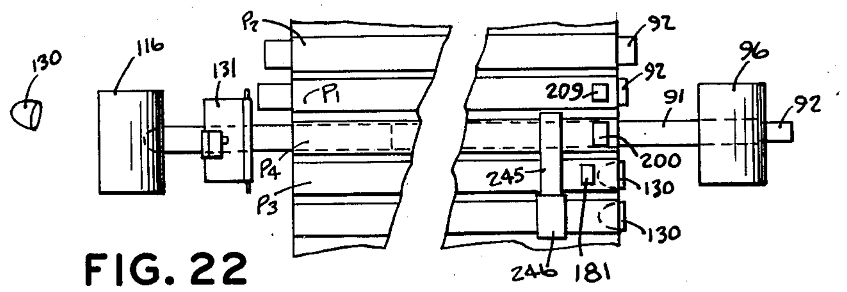
Figure 23:
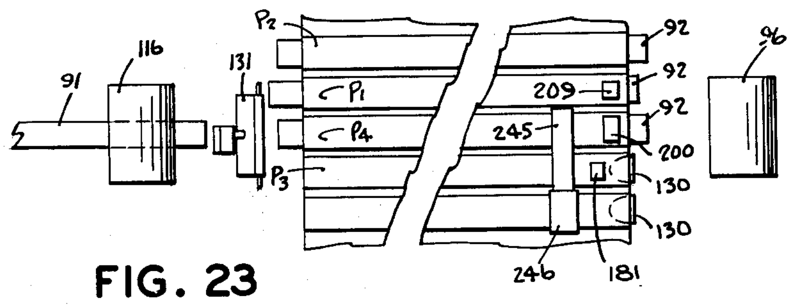

When, for example, the operator starts up in the morning, the main switch 260 is closed thus starting the various electric motors including motor 226 (FIG. 9). The various clamps are all raised as shown in FIG. 14 due to the previous de-energization of solenoids 178, 195, and 205 as will be apparent from FIG. 24. It will be assumed that pocket P1 has already been filled with a stuffer 92 as shown in FIG. 17, and that all the clamps are released. The operator then momentarily presses the index switch 215 to close a circuit to relay 216 as will be seen in FIG. 24. Energization of relay 216 closes the holding contacts 217 so that the operator can immediately release switch 215. In addition, the energization of relay 216 opens contacts 218 to prevent accidental closing of any clamping solenoid. On start-up all clamp solenoids are already de-energized due to the fact that both switches 250 and 261 are open, but on the initiation of a stuffing cycle during normal operation solenoids 178 and 205 will be de-energized due to the fact that holding switch was closed from the previous cycle. The fabric F then progresses one increment because the energization of relay 216 also opens the brake contacts 219 and closes the clutch contacts 220. The fabric then advances over the platform 30 until the finger 245 drops from the previously filled pocket P1 as shown in FIGS. 14 and 18. This dropping of finger 245 opens the switch 246 thus de-energizing relay 216 and stopping the fabric travel by closing the brake contacts 219 and opening the clutch contacts 220. De-energization of relay 216 also closes contacts 218 in the solenoid circuit. This, in effect, triggers the circuit for the next operation. The clamps are then actuated when the operator presses the hold switch 250 to complete a circuit to relay 262 and solenoids 178 and 205 which in turn actuate clamps 209 and 181 to hold the fabric in the pockets adjacent to the next pocket to be filled, which in this situation, is pocket P4, shown in FIG. 18 in the registered position. Momentary actuation of the hold switch 250 closes contacts 261 in the holding circuit when relay 262 is energized. To prevent accidental double operation, the energization of relay 262 also opens contacts 263 in the indexing circuit. With clamps 209 and 181 pressing the fabric against the platform, the operator inserts the needle 91 between rolls 95 and 96 so that it can advance and pick up the registered nose 130. As the needle progresses into pocket P4 as shown in FIG. 20, the nose expands this pocket until the finger 245 is raised to open switch 246 but relay 216 is not de-energized because contacts 263 has already been opened by relay 262. Continued insertion of the needle 91 through the pocket P4 inserts the stuffing 92 along with the needle until the nose 130 strikes the switch plate 131 to close switch 132 in the clamping circuit for solenoid 195. Clamping of the fabric in pocket P4 against the needle continues until the needle itself has passed the clamp 200 at which time the clamp retains the stuffing 92 while the needle is wtihdrawn from the pocket P4. As the nose 130 contacts rollers 115 and 116, it is removed from the needle and deposited on the conveyor belt. Continued advancing of the needle holds switch 132 closed until the tail of the needle has passed beyond the switchplate 131 at which point switch 132 opens and the clamp 200 is released due to de-energization of solenoid 195. Relay 262 remains energized due to the holding circuit through contacts 261 and the normally closed contacts 218. In this condition, the needle is returned to the loading side of the machine on the conveyor belt and reloaded with the next length of stuffing 92 by the operator. When the needle is placed in the upper trough ready for the next insertion, the operator repeats the cycle by momentarily closing the index switch 215. There is therefore this difference in the condition of solenoids 178 and 205 than when the machine is initially started. With the fabric still held clamped by the clamps 209 and 181, the initiation of the next cycle by closing of switch 215 energizes relay 216 which now opens contacts 218 to break the holding circuit through contacts 261 thus de-energizing relay 262, solenoids 178 and 205. A master switch 281 may be manually controlled to open the circuits to all the motors and solenoids to permit initial feeding or pulling back of the fabric on the platform as when starting a new roll.

The fabric produced in accordance with the previously described operation may be of the type in which the pleats are joined to each other at a point substantially midway of the thickness of the fabric. Such a fabric is shown in FIG. 25 in which the filled pleats 275, 275 are joined at 276, 276. If a fabric of this form is desired, no further operation may be indicated. However, in the event a flatback upholstery fabric is preferred, some or all of the yarns in the bottom ply 277 of the fabric may be heat shrinkable by means of which an application of heat shrinks the fabric ply 277 so that the joints 276 between the fabric are forced downwardly to provide a flatback material. An alternative form of the fabric which may be desired employs stuffing elements 92*a* having sloping or tapered sides as shown in FIG. 27. This produces wider gaps between the filled pleats in which the sides flare outwardly as opposed to the substantially parallel relation as shown in FIG. 26. An enlarged section of the fabric of FIG. 27 with the sloped sides appears in FIG. 28 in which the non-thermoplastic upper ply 278 forms the upper three sides of each pleat or pocket. The lower thermoplastic ply 276 of the fabric is substantially straight or flat so that the interwoven areas 276, 276 are substantially in line with the bottom of the pleats. It will be understood that the cross sectional shape of the stuffing may be square, rectangular, trapezoidal, plano-convex, circular, or any other shape.

It will thus be understood that we have provided an improved method and apparatus for inserting the stuffing in pleats of an upholstery fabric in a most practical and efficient manner. The apparatus includes means for insuring that the stuffing is accurately fed through each individual pleat without buckling the fabric, piercing of any of the pleats, or skipping a required insertion. The apparatus is semi-automatic in that some of the steps are performed manually. The important timing and controlling functions, however, are automatically regulated in such a way as to achieve maximum efficiency and product quality. The features of the apparatus described readily lend themselves to incorporation in a fully automatic machine and are, therefore, of basic importance.

Having thus described our invention,

We claim:

1. In apparatus for filling the pleats of a running length of textile fabric the combination which comprises a platform over which said fabric travels, driving means for moving the fabric across said platform, means for intermittently engaging and disengaging said driving means, edge control means for maintaining the travel of one selvedge of the fabric within predetermined limits, a plurality of spring loaded clamps mounted above said platform at a loading station along said aligned selvedge, means for sequentially actuating said clamps to hold the fabric selvedge in a registered position at the loading station, a needle for inserting a length of stuffing material into an aligned empty pleat positioned between two of said clamps, means for driving said needle into the pleat to insert a length of stuffing material therein, means for holding a length of material carried by the needle in the pleat, and means for pulling the empty needle out of the opposite end of the pleat.

2. Apparatus in accordance with claim 1 in which the clamping means are solenoid actuated and in which a detecting switch is positioned at the opposite edge of the fabric to control at least one of said clamping means.

3. Apparatus in accordance with claim 1 in which one of said clamping means is positioned substantially at the entering selvedge edge of the fabric, means for holding said clamp in a retracted position during initial passage of the needle, and means for actuating said clamp to a pressure position on the fabric when the needle is inserted into the fabric a predetermined distance.

4. Apparatus in accordance with claim 1 having conveyer means for returning the empty needle to the loading side of the machine.

5. A needle for inserting a filling material into the empty pleats of a textile fabric comprising a pair of superimposed resilient blades secured to each other at one end thereof and a pointed hollow tip adapted to be preinserted in each pleat of the fabric and into which the secured end of the needle is guided.

6. In apparatus for inserting stuffing material into the empty pleats of a textile fabric a platform, a friction roller mounted at one end of said platform over which the fabric is wound, means for intermittently driving said roller to move the fabric along the table in increments substantially equal to the width of one of said pleats in the fabric, a sensing finger at the opposite end of the platform, a spiral roll having a helical periphery journaled at said other end of the platform, means responsive to movement of the sensing finger for turning said spiral roll in opposite rotational directions to adjust the position of one selvedge of the fabric on the platform, a pleat loading station positioned substantially midway between said rollers, a pair of nip rolls mounted at said pleat loading station for driving a needle into an empty pleat, a second pair of nip rolls at the opposite side of the platform and in alignment with said first nip rolls for pulling the needle out of the pleat, a first clamp positioned at the loading station for pressing a previously filled pleat against the platform, a second clamp at said loading station for pressing a subsequent unfilled pleat against the platform, a hollow tip positioned in the empty pleat between said last-named pleats and in line with the nip rolls, and means for actuating said clamps and nip rolls to insert and withdraw a needle into the nose and through the pleat.

7. Apparatus in accordance with claim 6 having a third clamp positioned in registry over said middle pleat and means for pressing said third clamp against the fabric and the trailing end of the needle as the needle is withdrawn from the pleat.

8. In apparatus for filling the pleats of a running length of textile fabric, the combination which comprises a horizontal platform, a supply of said running length of fabric, a take up for said running length, means for intermittently controlling said takeup, a sensing finger positioned adjacent one end of the platform, a spiral roll over which said running length travels, means operatively associated with said sensing finger and said spiral roll for turning said spiral roll in either direction in accordance with the actuation of the sensing finger whereby at least one selvedge of the running length is maintained in a constant position as it travels over the platform, a needle loading trough positioned substantially midway of the platform, a pair of nip rolls mounted between the trough and the platform, means for driving one of said rolls, a pair of fabric clamps mounted along the controlled selvedge of the fabric over the platform and in line with the trough and the rolls, a third clamp positioned between said first clamps and along the selvedge, a solenoid for actuating each of said clamps, a sensing finger mounted in alignment with said last named clamp, a switch positioned to be actuated by said sensing finger, a second pair of nip rolls in line with the first rolls and at the opposite side of the platform, means for driving said second pair of rolls, a stuffing needle having flexible sides adapted to enclose a strip of stuffing material and to carry said stuffing material through the first pair of nip rolls and an aligned pleat in the fabric, means including a conveyer for returning the stuffing needle after passing through the second nip rolls to a position adjacent the trough, a switchplate pivotally mounted adjacent the second nip rolls, a switch operable by said switchplate, and electrical circuits connecting the switch and at least one of the solenoids.

9. In apparatus for filling the pleats of a running length of textile fabric, the combination which comprises a horizontal platform, means of feeding said running length across the platform, a needle loading trough positioned substantially midway of the platform, means for intermittently arresting the travel of the fabric with a pleat in alignment with said loading trough, a pair of nip rolls mounted between the trough and the platform, means for driving one of said rolls, a pair of fabric clamps mounted along the selvedge of the fabric over the platform and in line with the trough and the rolls, a third clamp positioned between said first clamps and along the selvedge, a solenoid for actuating each of said clamps, a sensing finger mounted in alignment with said last named clamp, a switch positioned to be actuated by said sensing finger, a second pair of nip rolls in line with the first rolls and at the opposite side of the platform, means for driving said second pair of rolls, a stuffing needle having flexible sides adapted to enclose a strip of stuffing material and to carry said stuffing material through the first pair of nip rolls and an aligned pleat in the fabric, means including a conveyer for returning the stuffing needle after passing through the second nip rolls to a position adjacent the trough, a switchplate pivotally mounted adjacent the second nip rolls, operable by passage of the needle, a switch operable by said switchplate, and electrical circuits connecting the switch and at least one of the solenoids.

10. Apparatus in accordance with claim 8 including a detachable hollow conical nose for guiding the needle through the pleat.

11. Apparatus in accordance with claim 10 including a detachable hollow conical nose for guiding the needle through the pleat.

12. Apparatus in accordance with claim 9 in which one of the clamps is off-set transversely of the fabric.

13. In apparatus for filling the pleats of a running length of textile fabric, the combination which comprises a horizontal platform, means of feeding said running length across the platform, a needle loading trough positioned substantially midway of the platform, means of intermittently arresting the travel of the fabric with a pleat in alignment with said loading trough, a pair of nip rolls mounted between the trough and the platform, means for driving one of said rolls, a pair of fabric clamps mounted along the controlled selvedge of the fabric over the platform and in line with the trough and the rolls, a third clamp positioned between said first clamps and along the selvedge, a solenoid for actuating each of said clamps, a sensing finger mounted in alignment with said last named clamp, a switch positioned to be actuated by said sensing finger, a second pair of nip rolls in line with the first rolls and at the opposite side of the platform, means for driving said second pair of rolls, a stuffing needle having flexible sides adapted to enclose a strip of stuffing material and to carry said stuffing material through the first pair of nip rolls and an aligned pleat in the fabric, means including a conveyer for returning the stuffing needle after passing through the second nip rolls to a position adjacent the trough, a switchplate pivotally mounted adjacent the second nip rolls, a switch operable by said switchplate, an electrical circuit for each of said solenoids, a manually operable switch in said circuit, a relay energizable by the sensing finger switch, and control means responsive to the energization of said relay for starting and stopping the said fabric travel arresting means.

14. Apparatus in accordance with claim 13 in which the solenoid circuit is provided with a switch responsive to the energization of the relay.

15. Apparatus in accordance with claim 13 in which the solenoid circuit and the relay circuit are provided with interlocking control means.

References Cited in the file of this patent

UNITED STATES PATENTS

| | | |
|---|---|---|
| 1,500,413 | Mitchell | July 8, 1924 |
| 2,033,584 | Mueller | Mar. 10, 1936 |